:::::::

United States Patent Office 2,867,644
Patented Jan. 6, 1959

2,867,644
PROCESS FOR THE PREPARATION OF RESINS FROM ABIETYL ALCOHOLS

René Leclercq, Woluwe Saint-Pierre, and René Oscar Paquet, Braine-le-Comte, Belgium, assignors to Union Chimique Belge S. A., Brussels, Belgium, a corporation of Belgium No Drawing. Application June 4, 1957
Serial No. 663,364
Claims priority, application Belgium June 22, 1956
4 Claims. (Cl. 260—453)

It is known that the diisocyanates react with monoalcohols to form monomeric urethanes.

The present invention relates to a process for preparing resins from diisocyanates and abietyl alcohols. These resins have remarkable resistance to acids or bases.

For the preparation of resins according to the present invention, at least one diisocyanate of the general formula OCN—R—NCO in which R represents a bivalent aliphatic or aromatic radical is used.

As abietyl alcohols, there are more especially known abietyl alcohol (I), dihydroabietyl alcohol (II) and tetrahydroabietyl alcohol (III).

The process of the present invention is applicable to one of these abietyl alcohols and to mixtures of them.

The commercial product "Abitol" of Hercules Powder Co. contains a mixture of these three alcohols. The proportions are generally 14–23% of alcohol I, 36–39% of alcohol II and 38–50% of alcohol III.

The proportions of the reaction mixtures consisting of diisocyanates and abietyl alcohols can vary within wide limits. The molecular ratio between diisocyanate and alcohol may be between 10:1 and 1:5, but it is better to take a molecular ratio of about 1:1.

In some cases, the reaction between abietyl alcohols and diisocyanates is exothermic, especially when the latter are aromatic. In order to carry out the preparation of the resins, it is necessary to heat the reaction mixture at a temperature between 100 and 300° C. The elimination of the volatile products is accelerated by heating in vacuo. Products with less colour are obtained by carrying out the reaction in an inert atmosphere.

Example 1

168 g. of hexamethylene diisocyanate (commercial product "Desmodur H" of Farbenfabriken Bayer A. G.) are reacted with 266 g. of abietyl alcohols in the form of "Abitol" in a flask fitted with a stirrer and a reflux condenser, the reaction taking place in a carbon dioxide atmosphere at a temperature between 160–170° C. After heating for 8 hours, there are obtained 430 g. of a very clear yellow resin, the molecular weight of which, determined by cryoscopy in a benzenic solution, is equal to 1550.

50 g. of the reaction product are dissolved in 50 g. of toluene. In this way, there is obtained a varnish which, dried during 30 minutes at 170° C., has a good resistance even to strong bases.

Example 2

Under the same conditions as in Example 1, 250 g. of methylene-bis-(4-penhyl isocyanate) (commercial product "Hylene M" of E. I. du Pont de Nemours and Co.) are reacted with 266 g. of the same abietyl alcohols. After heating for 9 hours, there are obtained 506 g. of a deep brown resin, the melting point of which is between 90 and 98° C.

50 g. of this resin are dissolved in 50 g. of toluene. A varnish is obtained which, when spread on a polished metal plate, protects the latter against corrosion even by strong acids.

Example 3

Using the same apparatus as in Example 1, 296 g. of 3,3'-dimethoxy-4,4'-diphenylene diisocyanate (commercial product "Dadi" of The Carwin Co.) are reacted with 266 g. of abietyl alcohols in the form of "Abitol." The mixture is heated for 8 hours at a temperature between 160–180° C. After cooling, there are obtained 562 g. of a clear brown resin, the melting point of which is 86–88° C.

The varnish obtained from 50 g. of this resin and 50 g. of toluene has a good resistance even to strong acids.

Example 4

The working conditions are the same as those of Example 3, except that 174 g. of toluene-2,4-diisocyanate (commercial product "Mondur TDS" of Mobay Chemical Co.) are used in the reaction. 422 g. of a clear brown resin are obtained, the melting point thereof being 55–60° C.

The varnish prepared from this resin also has a good resistance even to strong acids.

We claim:

1. A process for the preparation of diisocyanate resins which comprises reacting at a temperature between 100 and 300° C. and in the presence of an inert gas, at least one diisocyanate selected from the group consisting of methylene-bis-(4-phenyl-isocyanate), hexamethylene diisocyanate, toluene-2,4-diisocyanate and 3,3'-dimethoxy-4,4'-diphenylene diisocyanate, with at least one abietyl alcohol selected from the group consisting of abietyl, dihydroabietyl and tetrahydroabietyl alcohols, the molecular ratio of diisocyanates to abietyl alcohols used being between 10:1 and 1:5.

2. A process for the preparation of diisocyanate resins which comprises reacting at a temperature between 100 and 300° C. and in the presence of an inert gas, at least one diisocyanate selected from the group consisting of methylene-bis-(4-phenyl-isocyanate), hexamethylene diisocyanate, toluene-2,4-diisocyanate and 3,3'-dimethoxy-4,4'-diphenylene diisocyanate with at least one abietyl alcohol selected from the group consisting of abietyl, dihydroabietyl and tetrahydroabietyl alcohols, the molecular ratio of diisocyanates to abietyl alcohols used being 1:1.

3. A diisocyanate resin prepared by reacting at a temperature between 100 and 300° C. and in the presence of an inert gas, at least one diisocyanate selected from the group consisting of methylene-bis-(4-phenyl-isocyanate), hexamethylene diisocyanate, toluene-2, 4-diisocyanate and 3,3'-dimethoxy-4,4'-diphenylene diisocyanate with abietyl alcohols selected from the group consisting of abietyl, dihydroabietyl and tetrahydroabietyl alcohols and their mixtures, the molecular ratio of diisocyanates to abietyl alcohols used being between 10:1 and 1:5.

4. A diisocyanate resin prepared by reacting at a temperature between 100 and 300° C. and in the presence of an inert gas, at least one diisocyanate selected from the group consisting of methylene-bis-(4-phenyl-isocyanate), hexamethylene diisocyanate, toluene-2-, 4-diisocyanate and 3,3'-dimethoxy-4,4'-diphenylene diisocyanate with abietyl alcohols selected from the group consisting of abietyl, dihydroabietyl and tetrahydroabietyl alcohols and their mixtures, the molecular ratio of diisocyanates to abietyl alcohols used being 1:1.

References Cited in the file of this patent
UNITED STATES PATENTS

| | | |
|---|---|---|
| 2,311,587 | Vaala | Feb. 16, 1943 |
| 2,750,367 | Sanderson | June 12, 1956 |
| 2,801,990 | Seeger et al. | Aug. 6, 1957 |